United States Patent Office 3,388,247
Patented June 11, 1968

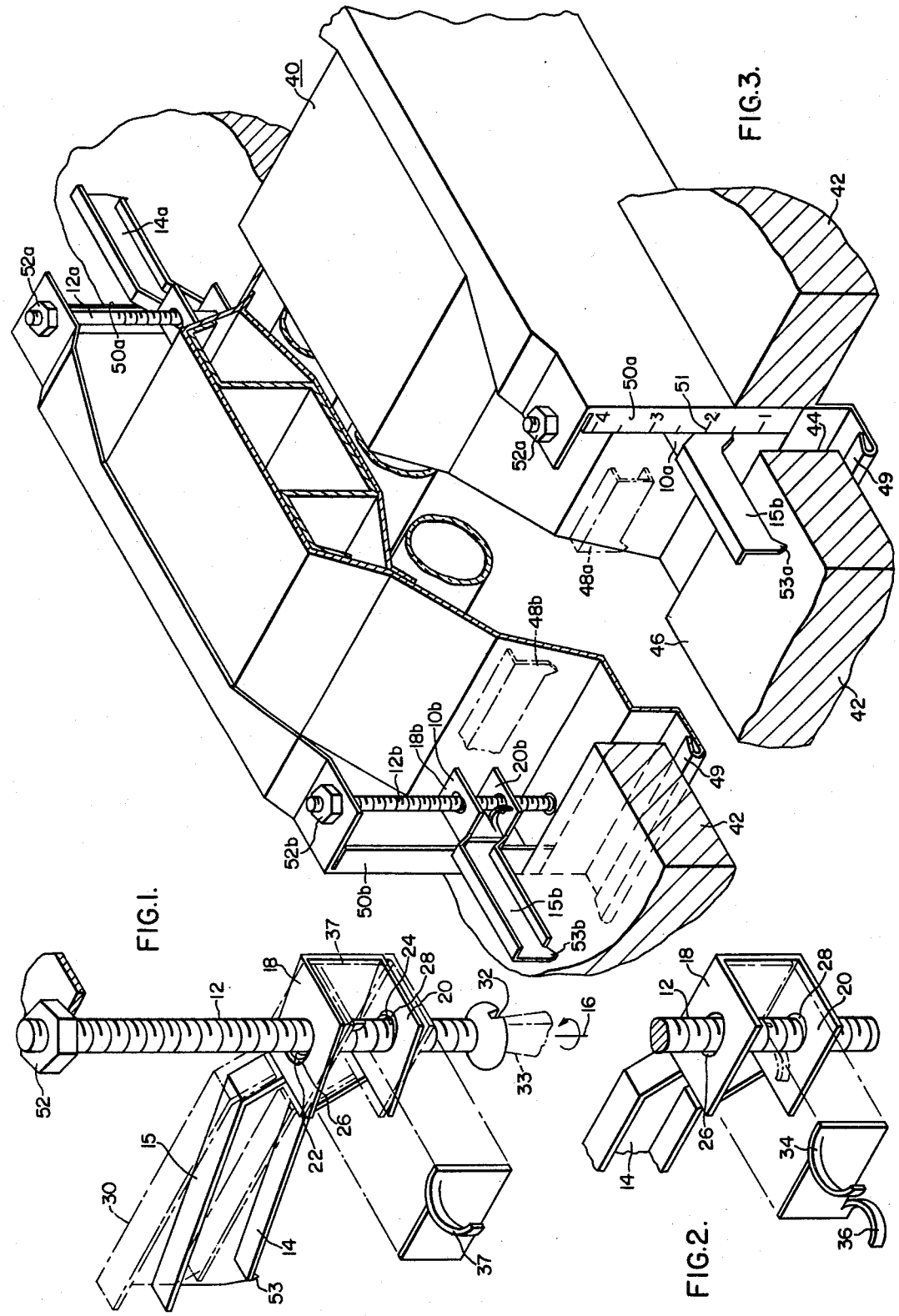

3,388,247
LUMINAIRE AND AN ADJUSTABLE SECURING DEVICE THEREFOR
Carle E. Rackley, Westlake, Ohio, assignor to Westinghouse Electric Corporation, Pittsburgh, Pa., a corporation of Pennsylvania
Filed Dec. 30, 1965, Ser. No. 517,660
10 Claims. (Cl. 240—78)

ABSTRACT OF THE DISCLOSURE

An adjustable securing device for mounting a luminaire or similar article to a rafter or support. The article has affixed thereto in spaced relationship a plurality of vertically extending screws each of which carries a tiltable and rotatable hanger member which includes a pair of parallel arms having screw engaging apertures and an extending support member. The hanger is tiltable to remove lip portions of the screw engaging apertures from engagement with the screw to provide quick adjustment of the hanger along the screw. Coaction between the extending support member and the rafter or support reengages the lip portions of the apertures with the screw to secure the luminaire or article in its mounted position.

---

This invention relates generally to luminaires and, more particularly, to adjustable securing devices that may be employed to quickly secure a recessed luminaire within a ceiling opening.

Heretofore, recessed luminaires have been secured to the ceiling by means of long bolts or screws positioned at the sides of the luminaire. Extending hanger members engaged the threads of the screws and extended over the rafter to support the luminaire. As the screws were tightened from below, the position of the luminaire with respect to the ceiling was adjusted. The screws were generally very long to accommodate differences in ceiling or rafter thickness. It frequently required several minutes of turning the screws before the luminaire was raised to a flush position with the ceiling.

It is therefore an object of this invention to provide a novel quick-adjusting securing device.

It is another object of this invention to provide a securing device which can be adjusted with improved rapidity to accommodate fixed securing members of various dimensions.

It is an additional object of this invention to provide a threaded securing device which holds in a very positive fashion.

It is a further object of this invention to provide a quick-adjusting, threaded securing device, the threaded engagement of which is positively maintained as the device is secured in its desired position.

It is yet another object of this invention to provide a luminaire having a quick-adjusting and securing device for adjusting and securing recessed luminaires within a ceiling opening.

Briefly these and other objects are achieved by providing an elongated screw or bolt which is mounted on the supported object or luminaire, so as to be rotatable about its own longitudinal axis. The screw is substantially longitudinally fixed with respect to the luminaire. A tiltable hanger or supporting member is provided engaging the screw. The tiltable member is tiltable from a normal securing position with respect to the screw into a quick-adjusting position. An extending member forms a part of the tiltable member and extends over and engages the upper surface of a fixed supporting means such as the ceiling rafter. The tiltable hanger member has an arm means forming a part thereof proximate the screw. The arm means has spaced lip portions which engage the surface of the screw when the tiltable member is in the securing position. At least one of the lip portions threadably engages the screw thus preventing longitudinal motion thereof. The spaced lip portions engage the screw at positions on generally opposed sides of the screw and generally displaced along the longitudinal axis of the screw. In the quick-adjusting position the lip portions are disengaged from the threads and the tiltable member may be rapidly positioned or moved along the screw axis. Surfaces are provided on the screw to facilitate rotation of the screw, preferably with the aid of a tool such as a screw driver or the like. When the tiltable supporting member is in the securing position, the screw is rotated to final adjust the position of the luminaire with respect to the ceiling, causing outwardly extending flange members to engage the undersurface of the ceiling. Further rotation exerts additional upward pressure on the extending member causing the lip portions to be pressed more firmly against the screw surfaces to form a tighter engagement.

Further objects and advantages of this invention will become apparent as features of novelty which characterize the invention are pointed out in more particularity in the following detailed description.

For a better understanding of the invention reference may be had to the accompanying drawings wherein:

FIGURE 1 is an isometric view of the present securing device with the tiltable member in the quick-adjustable position, with the retaining spring being shown in exploded form;

FIG. 2 is a view similar to FIG. 1 except that a modified retaining spring is utilized, with the modified retaining spring also shown in exploded form;

FIG. 3 is a perspective view, partly in section and with the middle portion broken away, showing a luminaire being installed in a ceiling opening by means of a plurality of the present securing devices.

Referring to FIG. 1, the securing device 10 comprises an elongated screw or bolt 12 and a tiltable member 14 (shown in the adjusting position) which may be rapidly slid and positioned along the axis 16 of screw 12. An extending member 15 forms a part of tiltable member 14. The tiltable member 14 is provided with two arms 18 and 20, which are provided with apertures 22 and 24 respectively. Lip portions 26 and 28 are formed along a portion of the apertures 22 and 24 respectively for releasably engaging the surface of screw 12. At least one of the lip portions threadably engages the screw when the tiltable member is in the securing position. This engagement prevents longitudinal movement of the screw 12 with respect to the tiltable member 14 other than that longitudinal movement resulting from controlled rotation of the screw 12. The arm apertures have a greater opening area than the cross-sectional area of the screw 12 to allow the tiltable member 14 to slide therealong. This sliding allows the tilting member to be quickly preset in accordance with the ceiling thickness as described hereinafter in relation to FIG. 3. When the tiltable member 14 is raised to the securing position as indicated by the dotted outline 30 in FIG. 1, the lip portions 26 and 28 engage the surface of the screw 12. Preferably a surface means, such as slot 32 for example, is affixed to screw 12 so that screw 12 may be controllably rotated by the screw driver 33 (Fragmentarily shown in dot-dash in FIG. 1). As the screw 12 is rotated, the tilable member 14 progresses along the axis 16 of the screw 12. A retaining spring 37 (shown in greater detail in exploded form) may be provided, preferably connected to the tiltable member 14 between the arms 18 and 20, to retain a spring urged engagement between the lip portion 26 and 28. The spring 37 exerts a spring pressure forcing the screw 12 into the lip portion 26, and the spring 37 tends to force the screw 12 into engagement with the lip portion 28. In this embodiment, the spring pressure is such as to automatically return the tiltable member 14 to the securing position after the tiltable member 14 has been preset along screw axis 16.

In FIG. 2 is shown a modification of the spring 37, which modified spring comprises two spring members 34 and 36, with the unitary spring which comprises the individual parts 34 and 36 shown in detail in the exploded view. In this embodiment, the spring members 34 and 36 tend to centralize the screw 12 so that it is normally held in a securing position with the screw threads maintained in engagement with the lips 26 and 28 by both spring members 34 and 36.

Referring to FIG. 3, a luminaire 40 is shown being installed into a ceiling 42 through ceiling opening 44. When the luminaire is initially inserted into ceiling opening 44, the securing devices 10a and 10b are positioned with extending members 15a and 15b against the sides of the luminaire 40 so as to pass through the ceiling opening 44 without striking the ceiling 42. In the preferred form, the securing devices 10a and 10b are identical, except that both devices 10a incorporate right-hand screws 12a and the devices 10b (only one being shown) each incorporate left-hand screw 12b. Another securing device 10b (not shown) is located in the diagonally opposite corner of the luminaire 40 from the securing device 10b as shown.

The luminaire installation positions of the tiltable members 14a and 14b are indicated by dotted outlines 48a and 48b in FIG. 3 Opposing side flanges 49 are provided on at least one pair of opposing sides of the luminaire. These side flanges 49 project outwardly from the luminaire 40, preferably along the lower portions of the longitudinal sides, and limit the insertion of the luminaire 40 into the ceiling opening 44. After the luminaire 40 has been inserted, the tiltable members 14a and 14b are rotated from the dotted-line positions so as to swing the extending members away from the luminaire sides out over the ceiling 42, to the position shown in full lines in FIG. 3. The tiltable members are swung into the outward or projecting position by rotating the corresponding screws 12a and 12b until the tiltable members contact a stop means or vertical end struts 50a and 50b respectively. These stop means 50a and 50b prevent further swinging of the tiltable members 14 as the screws 12 are rotated. Further rotating of the screws 12a and 12b cause the corresponding tiltable members to travel down the screws and engage the upper surface 46 of ceiling 42.

The final adjustment of the position of the luminaire with respect to the ceiling is accomplished by rotating the screw 12 until the luminaire 40 is in the desired position with respect to the ceiling 42. Normally, it is desired that the side flanges 49 engage the visible or lower surface of the ceiling 42. Prior to insertion of the luminaire 40 into the ceiling opening 44, the tiltable members 14 are rapidly prepositioned on the screws 12 in accordance with the thickness of the particular ceiling involved. If desired, ruler markings 51 may be provided on the side of the end struts 50a and 50b as shown in FIG. 3. Thus before installation into ceiling opening 44, the tiltable members 14 are preset to the correct ceiling thickness with the aid of these ruler markings 51. This procedure assures a minimum of time lost due to turning the screws 12 during the final adjusting of the luminaire with respect to the ceiling.

Preferably the lower extremity of each extending member forms points 53a and 53b respectively, as shown in FIG. 3. These points engage the ceiling upper surface 46 and are forced therein due to the weight of the luminaire 40, and the leverage of the screws 12. In addition, the tightening of the screws 12a and 12b after final adjustment causes each of the extending members 15 and the side flanges 49 to squeeze in on the ceiling 42 from the top and bottom respectively. Thus, an upward force is exerted on the extending members causing at least one of the lip portions 26 and 28 to laterally engage the threads of the screws in a very positive fashion. This lateral force applied between the lip portions 26, 28 and the screw threads is additive to the normal longitudinal force and engagement between the screw threads and at least one lip portion.

As described hereinbefore, the screws 12a have right-hand threads and are turned clockwise both to swing the tilting member 14a into the outward position and to finally adjust and tighten the securing device 10a. To preserve the symmetry of the luminaire 40, screws 12b, one of which is not shown, have left-hand threads and must be rotated counterclockwise to swing the tilting member 14b into the outward position and tighten the securing device 10b.

Both screws 12a and 12b are rotatably secured to the housing, preferably by fiber nuts 52a and 52b. These nuts 52a and 52b permit the screws to be rotated without loosening. They also secure the screws 12a and 12b longitudinally with respect to the luminaire 40.

It will be apparent to those skilled in the art that the objects of this invention have been achieved by providing a two position securing device which is quickly adjustable while in the adjusting position, and which may be tightly secured when in the securing position. Either position may be established in the device simply by tilting one member with respect to the other. Improved tightness is provided by the arm and lip construction which engages the threads more positively as the tightening proceeds.

Although the invention has been described with respect to a particular embodiment thereof, it is not to be so limited as changes and modifications may be made therein which are within the intended scope of the invention.

I claim as my invention:

1. A quick-adjustable securing device adapted to engage a fixed supporting means and further adapted to be connected to a supported object for securing the supported object to the fixed supporting means and for adjusting the position of the supported object with respect to the fixed supporting means, said securing device comprising:

a threaded elongated screw means adapted to be connected to the supported object, said screw means being rotatable about its own longitudinal axis but adapted to be substantially fixed in a longitudinal position with respect to the supported object;

a tiltable supporting member disposed on said screw means and having a securing position and a quick-adjusting position with respect to said screw means, said securing position being the normal position with respect to said screw means, said quick-adjusting position being established by tilting said tiltable supporting member in a predetermined direction with respect to said screw means which is away from said securing position;

an extending member forming a part of said tiltable supporting member and adapted to engage the fixed supporting means for supporting the supported object and for retaining said tiltable-supporting member in said securing position;

arm means forming a part of said tiltable supporting member and provided with a pair of lip portions which engage the surface of said screw means at generally oppositely disposed and longitudinally spaced positions along the axis thereof when said tiltable supporting member is in said securing position, with at least one of said lip portions engaging the threads of said screw means to prevent any longitudinal movement of said tiltable supporting member with respect to said screw means other than that controlled longitudinal movement resulting from controlled rotation of said screw means;

said lip portions being disengaged from said screw means when said tiltable supporting member is tilted into said quick-adjusting position to allow rapid longitudinal motion of said tiltable supporting member with respect to said screw means; and means affixed to said screw means for facilitating said controlled rotation of said screw means about its longitudinal axis for final adjustment of the supported object with respect to the fixed supporting means.

2. The securing device as specified in claim 1, wherein said arm means includes a pair of spaced arm members, each having one of said lip portions formed thereon.

3. The securing device as specified in claim 2, wherein each of said arm members is provided with an aperture, one of said lip portions being formed on a portion of the peripheral edge of one aperture and the other of said lip portions being formed on the generally opposite peripheral edge of the other aperture.

4. The securing device as specified in claim 2, wherein a spring member is connected to said tiltable supporting member and exerts a spring pressure on said screw means to retain a spring-urged engagement between said lip portions and said screw means.

5. In combination, a luminaire adapted to be mounted in a recessed position within a ceiling and quick-adjustable securing device means adapted to engage the ceiling for securing said luminaire to the ceiling and for adjusting the position of said luminaire with respect to the ceiling, said securing device means comprising:

a threaded elongated screw means connected to said luminaire, said screw means being rotatable about its own longitudinal axis but substantially fixed in longitudinal position with respect to said luminaire;

a tiltable supporting member disposed on said screw means and having a securing position and a quick-adjusting position with respect to said screw means, said securing position being the normal position and said quick-adjusting position being established by tilting said tiltable supporting member in a predetermined direction with respect to said screw means which is away from said securing position;

an extending member forming a part of said tiltable supporting member and adapted to engage the ceiling for supporting said luminaire and for retaining said tiltable supporting member in said securing position;

arm means forming a part of said tiltable supporting member and provided with a pair of lip portions which engage the surface of said screw means at generally oppositely disposed and longitudinally spaced positions along the axis thereof when said tiltable supporting member is in said securing position, with at least one of said lip portions engaging the threads of said screw means to prevent any longitudinal movement of said tiltable supporting member with respect to said screw means other than that controlled longitudinal movement resulting from controlled rotation of said screw means;

said lip portions being disengaged from said screw means when said tiltable-supporting member is tilted into said quick-adjusting position to allow rapid longitudinal motion of said tiltable supporting member with respect to said screw means; and means affixed to said screw means for facilitating said controlled rotation of said screw means about its longitudinal axis for final adjustment of said luminaire with respect to the ceiling.

6. The combination as specified in claim 5, wherein said luminaire is provided with opposed outwardly extending flange members, the upper surfaces of which engage the lower surface of the ceiling proximate said luminaire when said luminaire is finally adjusted with respect to the ceiling, said device having means causing the ceiling surface to exert pressure against said extending members which force said tiltable supporting member more firmly into the securing position as said screw means is rotated during the final adjustment of said luminaire with respect to the ceiling.

7. The combination as specified in claim 5, wherein a stop means is provided on said luminaire to prevent said securing device from rotating more than a predetermined angle which permits said extending member to project away from said luminaire as said screw means is rotated.

8. The securing device as specified in claim 7, wherein said arm means includes a pair of spaced arms, each of which is provided with an aperture, one of said lip portions being formed on a portion of the peripheral edge of one aperture and the other of said lip portions being formed on the generally opposite peripheral edge of the other aperture.

9. The securing device as specified in claim 7, wherein a spring member is connected to said tiltable supporting member and exerts a spring pressure on said screw means to retain a spring-urged engagement between said lip portions and said screw means.

10. The securing device as specified in claim 9, wherein two spring members are provided, each connected to said tiltable member and exert a spring pressure on said screw means, one of said spring members forcing said screw means against said lip portion on one of said arms, and the other of said spring members forcing said screw means against said lip portion on the other of said arms.

References Cited

UNITED STATES PATENTS

| 2,954,201 | 9/1960 | Pascucci et al. | 240—78 |
| 2,966,325 | 12/1960 | Pascucci | 240—78 |
| 3,018,082 | 1/1962 | Berger | 248—343 |

FOREIGN PATENTS 670,886  9/1963  Canada.

NORTON ANSHER, *Primary Examiner.*

M. H. HAYES, *Assistant Examiner.*